United States Patent [19]

Walker

[11] E Re. 31,546

[45] Reissued Apr. 3, 1984

[54] ANTI-MISSILING BOTTLE CLOSURE

[75] Inventor: Rocco D. Walker, Hazelton, Pa.

[73] Assignee: Zapata Industries, Inc., Frackville, Pa.

[21] Appl. No.: 461,170

[22] Filed: Jan. 26, 1983

Related U.S. Patent Documents

Reissue of:

[64] Patent No.: 4,007,851
Issued: Feb. 15, 1977
Appl. No.: 576,206
Filed: May 9, 1975

[51] Int. Cl.[3] ..... B65D 51/16

[52] U.S. Cl. ..... 215/307

[58] Field of Search ..... 215/260, 261, 307, 311, 215/314, 252; 220/289, 303, 366, 367

[56] References Cited

U.S. PATENT DOCUMENTS

| | | | |
|---|---|---|---|
| 51,303 | 12/1865 | Fry | 215/262 |
| 809,789 | 1/1906 | Duncan | 215/314 |
| 1,722,461 | 7/1929 | Funk . | |
| 1,766,581 | 6/1930 | Baker . | |
| 2,521,773 | 9/1950 | Bierman | 220/303 |
| 2,781,943 | 2/1957 | Carlstrom . | |
| 3,083,854 | 4/1963 | Lusher | 215/307 |
| 3,302,664 | 2/1967 | Plamann . | |
| 3,455,479 | 7/1969 | Hadley | 215/252 |
| 3,713,545 | 1/1973 | Lawrence | 215/260 |
| 3,888,347 | 6/1975 | Kramer | 215/307 X |
| 3,964,508 | 6/1976 | Miller | 220/366 |

FOREIGN PATENT DOCUMENTS

| | | | |
|---|---|---|---|
| 142297 | 7/1951 | Australia | 215/307 |
| 1072127 | 12/1959 | Fed. Rep. of Germany . | |
| 974274 | 9/1950 | France | 215/307 |
| 1084240 | 7/1954 | France . | |
| 48-9400 | 3/1973 | Japan . | |
| 220476 | 7/1942 | Switzerland | 215/307 |

*Primary Examiner*—Donald F. Norton
*Attorney, Agent, or Firm*—Pennie & Edmonds

[57] ABSTRACT

Pressure relief openings are provided in roll-on (twist-off) closures for beverage bottles to release gas pressure within the closure promptly as the closure is turned to remove it and before missiling of the closure can occur.

29 Claims, 9 Drawing Figures

ANTI-MISSILING BOTTLE CLOSURE

Matter enclosed in heavy brackets [ ] appears in the original patent but forms no part of this reissue specification; matter printed in italics indicates the additions made by reissue.

BACKGROUND OF THE INVENTION

This invention is concerned with improved closures for containers for pressurized fluids and is more particularly concerned with improvement of beverage bottle closures to prevent closure-missiling.

A popular type of glass bottle for beer or carbonated beverages has a neck provided externally with about one and one quarter turns of threads. A closure having an internal seal engaging the mouth of the bottle is threaded onto the neck, the closure threads being formed in situ by a device which rolls threads onto the malleable side wall of the closure cup, using the glass threads of the bottle as a die. In many cases the neck of the bottle below the threads is formed with a circumferential pilfer-proof band about which the skirt of the cap is rolled to lock the cap to the bottle. The cap may be provided with horizontal and/or vertical lines of weakness in the region of the pilfer-proof band which break when the cap is twisted to remove it.

This type of container has inherently had a potentially serious problem—premature release of the cap, termed "closure-missiling." When the user twists the cap to remove it, 90° of twisting is sufficient to leave only about one turn of thread retaining the cap on the bottle. The initial turning of the cap permits pressurized gas to enter between the side wall of the cap and the bottle, tending to bulge the cap side wall outwardly. The closure has to turn many degrees before venting of the trapped gas can occur. Before this gas can be released to the atmosphere, the pressure build-up in the cap may be sufficient to overcome the tenuous remaining thread engagement and fire the cap into the air like a missile. The potential danger to the user and to bystanders is self-evident.

The broad problem of pressure build-up within bottles or jars and attempts to solve that problem by venting pressurized gas are, of course, not new, See, for example, U.S. Pat. No. 1,739,659 to Spahn; U.S. Pat. No. 2,990,079 to Garvey; U.S. Pat. No. 2,161,097 to Schroder-Nielsen; U.S. Pat. No. 2,144,273 to Raymond; U.S. Pat. No. 1,694,851 to Glass; and U.S. Pat. No. 3,433,379 to Moldavsky et al. In general, attempts have been made in the prior art to modify the bottle or jar or the closure to provide safety vents for the release of excessive fluid pressure. However, the prior art is devoid of any teaching or suggestion of a solution to the cap-missiling problem referred to above, where the problem occurs only when the user commences to remove the closure, pressure maintenance being required at all other times.

BRIEF DESCRIPTION OF THE INVENTION

It is accordingly a principal object of the present invention to provide a solution to the closure-missiling problem and to provide improved closures for solving that problem.

A further object of the invention is to provide improved roll-on closures, whether of the pilfer-proof or non-pilfer-proof type, which can be economically mass-produced and which solve the closure-missiling problem without adversely affecting the cap seal or the threads and which operate properly and safely when removed in the conventional manner (without special procedures).

Briefly stated, in accordance with a preferred form of the invention, a roll-on closure for a pressurized-beverage bottle of the type having a neck provided with about one and one quarter turns of external threads is provided with one or more (preferably at least three) venting openings contiguous to the upper end of the closure. The dimensions and locations of the venting openings are selected to provide adequate, safe venting of gas from within the cap when the cap is initially turned to remove it, without interference with the seal or the threads, and irrespective of the manner in which the user grasps the closure.

BRIEF DESCRIPTION OF THE DRAWINGS

The invention will be further described in conjunction with the accompanying drawings, which illustrate preferred and exemplary embodiments, and wherein.

DETAILED DESCRIPTION OF THE INVENTION

Figure 1:
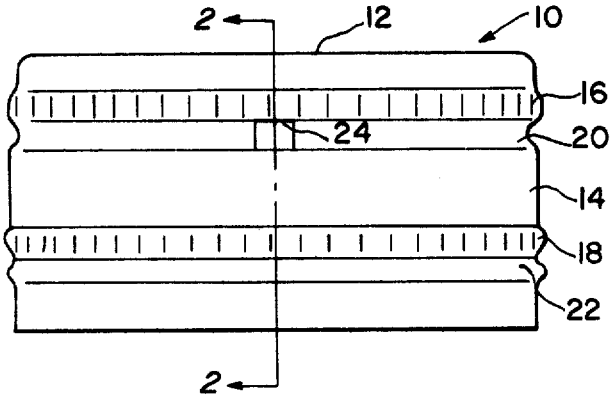
FIG. 1 is an elevation view of a first embodiment of the invention, prior to thread forming.

Referring to the drawings, and initially to FIGS. 1 and 2 thereof, the invention will be described with reference to its principal application to roll-on closures for glass bottles for containing beer or carbonated beverages, such as closures for G.C.M.I. 1625 series glass finish bottles, but the broader aspects of the invention are applicable to other types of closures as well. Closure 10 is in the form of a cup or shell of malleable material. Typically, the cups are punched and formed from sheets of decorated aluminum or aluminum alloy (for roll-on closures) to provide a top wall 12 and an integral side wall 14. The cups pass through a knurler which gives final shaping to the cups and puts one or more knurls on the cups. In the embodiment illustrated, upper and lower knurls 16 and 18, respectively, are provided, circumferential grooves 20 and 22 being formed beneath the corresponding upper and lower knurl beads. If desired, one of the knurls may be omitted. A plastic gasket or seal (to be referred to more fully hereinafter) is then inserted in the cup and bonded to the inner surface of the top wall 12. This much is conventional.

In accordance with the invention, one or more venting openings are also provided in the closure manufacturing operation. In FIGS. 1 and 2 one such opening is shown at 24, just above groove 20 (and above the threads to be formed), and there are preferably several such openings (say, four) which may be regularly spaced about the circumference of the cap. The width of the conventional groove 20, about 0.060 inch, may be reduced to about 0.040 inch to facilitate the formation and placement of the venting openings. Openings 24 may be formed during the knurling operation, for example, with a knife having a suitable number of opening-forming cutters on it, for example, four. Each opening is typically about 0.080 inch long (circumferentially) or less and about 0.020 inch wide. The openings may be formed by cutting and depressing the cap material inwardly without actually removing the cap material.

Figure 2:
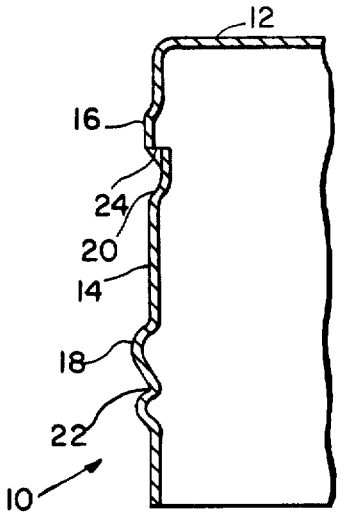
FIG. 2 is an enlarged, fragmentary, sectional elevation view taken along line 2—2 of FIG. 1.
Figure 8:
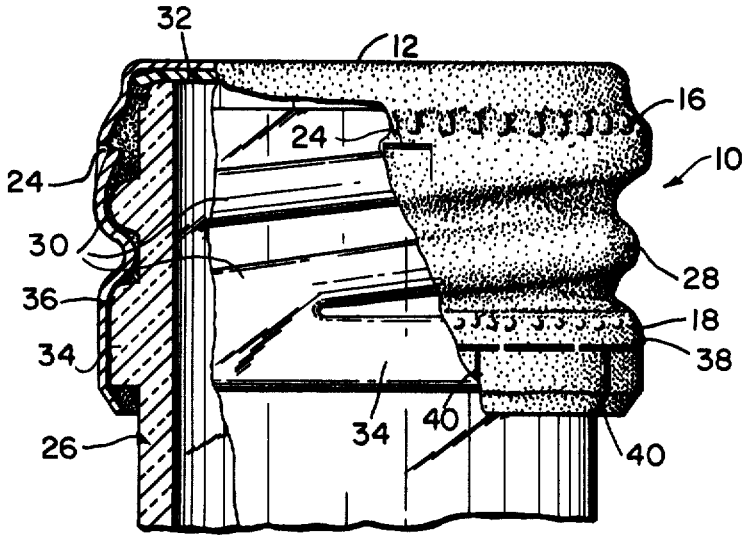
FIGS. 8 and 9 are enlarged partly sectional elevation views illustrating the relationship of the closure to the bottle before and during closure removal, respectively, venting being shown in FIG. 9.

FIG. 8 illustrates the application of a cap of the type shown in FIGS. 1 and 2 to a glass bottle 26. Threads 28, about 1¼ turns, have been rolled onto the cap in a conventional manner, using the glass threads 30 of the bottle as a die. The gasket or seal 32 is shown engaging the mouth region of the bottle, which may have been filled with a carbonated beverage or beer, for example. In the form shown, the skirt of the closure has been rolled under a pilfer-proof band 34 of the bottle, and the pilfer-proof ring 36 of the skirt has been provided in the conventional cap manufacturing operation with horizontal and vertical lines of weakness (lances) 38 and 40 to facilitate removal of the cap and separation of the ring 36 from the bottle.

Figure 9:
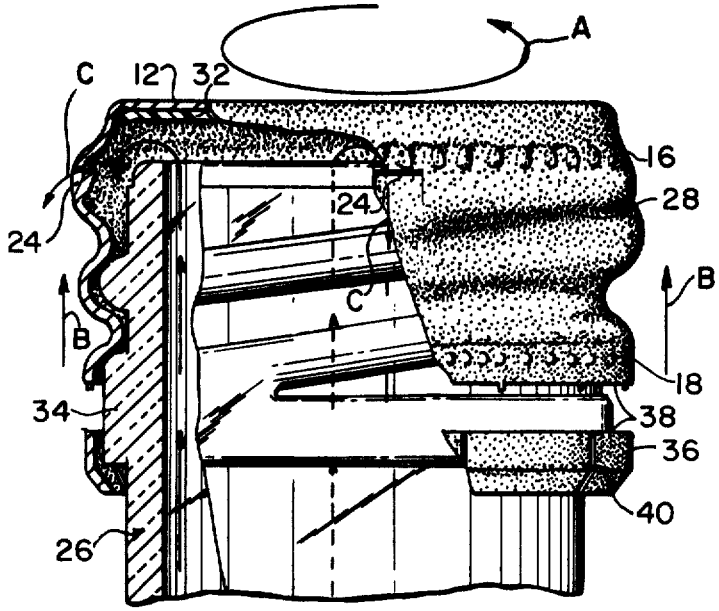

FIG. 9 illustrates what happens when the cap is twisted to remove it, counterclockwise twisting being indicated by arrow A and resultant upward movement of the cap relative to the bottle by arrows B. In the form shown the cap breaks along the line of weakness 38. Also, ring 36 may become detached from the bottle by breakage of one or more of the lines of weakness 40. Almost as soon as the cap commences to turn, gas released from the mouth of the bottle enters the space between the side wall of the cap and the neck of the bottle, and in absence of the invention the pressure may be sufficient to fire the cap from the bottle when the threads have been only partially disengaged. However, with the venting openings of the invention located so as to be freely spaced from the neck when the cap is applied to the bottle, as shown in FIG. 8, before missiling can occur the gas pressure within the cap is released to the atmosphere by flow of gas through the venting openings, as indicated by arrows C. Substantial release of gas occurs before the cap has turned about 90° to unthread it from the bottle, preferably within about 10° to 20° C. of initial turning, although some venting occurs later also. Cap-missiling is thus prevented.

Although gas which flows from the bottle and into the space between the cap side wall and the bottle neck will eventually find release to the atmosphere even without the pressure relief openings of the invention, the engagement of the cap threads with the bottle threads traps the gas and prevents rapid dissipation of pressure within the cap until the threads are disengaged to a degree which permits missiling. With the invention, on the other hand, direct, rapidly available venting openings provide prompt release of gas pressure within the cap, and missiling is avoided or prevented.

Figure 3:
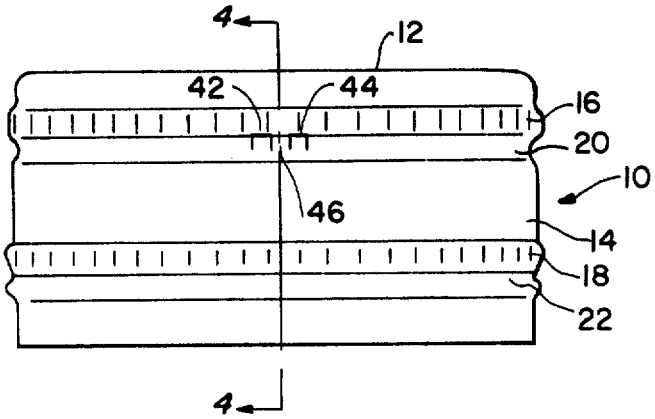
FIG. 3 is a view similar to FIG. 1, but of another embodiment.
Figure 4:
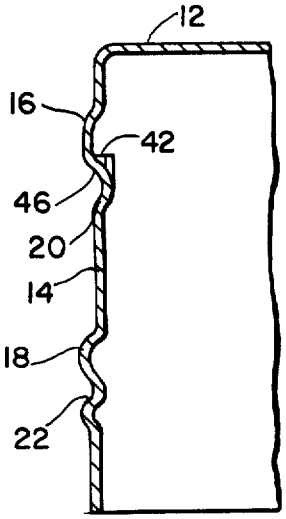
FIG. 4 is a view similar to FIG. 2, but taken along line 4—4 of FIG. 3.

FIGS. 3 and 4 illustrate another embodiment of the invention, in which the venting openings are formed in groups or sets, one group of two such openings 42 and 44 separated by a bridge 46 being shown. Preferably several such groups (say, four) are provided, regularly spaced about the circumference of the cap. Typically, each group of openings comprises two slits, each about 0.055 inch long (circumferentially) and about 0.020 inch wide, and bridge about 0.040 inch long.

Figure 5:
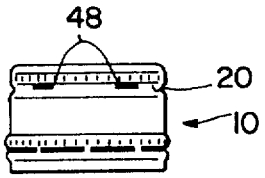
FIGS. 5–7 are elevation views of further embodiments prior to thread forming.
Figure 6:
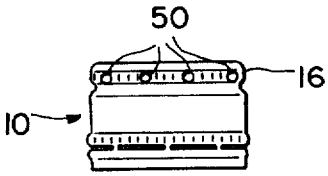
Figure 7:
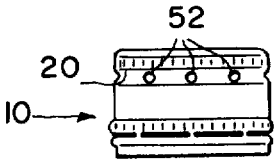

FIGS. 5–7 illustrate other embodiments of the invention. In FIG. 5, the venting openings are horizontal slits 48 in the region of groove 20. In FIG. 6 the venting openings 50 are round holes between portions of the upper knurl region. In FIG. 7 the venting openings 52 are round holes in the region of the groove 20.

The location of the venting openings is quite important. If the openings are placed above the top knurl, the sealing gasket may partly block the openings, and also the integrity of the seal may be impaired. If the openings are placed too far below the top knurl, they may be partly or completely closed during the thread forming operation by rolling them into the bottle threads. Openings just below the upper knurl or in the region of the upper knurl (all of which may be termed "contiguous to the upper knurl") are preferred, openings just below the upper knurl being the best mode presently contemplated. The location of the venting openings also is influenced somewhat by the ease of manufacture.

Although theoretically one venting opening could be made large enough to control missiling, providing the user's hand did not block the opening, multiple openings avoid the need for special care on the part of the user in removing the closure and are used for another reason which will now be discussed.

In the embodiment of FIGS. 1 and 2 it was found that when the closure was applied to the bottle, the pressure of the thread rollers working on the aluminum closure to form the threads into the bottle caused slits more than about 0.080 inch long to open, exposing sharp edges which could injure the user and which were unsightly. When the venting openings were provided in sets, as in FIGS. 3 and 4, it was found that if the bridge were less than about 0.040 inch long (say 0.030 inch), the bridge would break on occasion, depending upon how the closure happened to go on the bottle and how the thread rollers happened to contact the closure in relation to the groups of openings and in relation to the bottle. Thus, in practice plural openings are required, and the dimensions must be controlled to avoid the foregoing problems, while providing adequate venting, of course. Openings having the configuration shown in FIGS. 1 and 2 or FIGS. 3 and 4 are preferred, although elongated openings or round openings formed by metal removal, or other opening shapes, may be used.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. An improved closure of the type having a shell with integral top and side walls, a knurl region adjacent to the top wall, and with rolled-on threads provided on the side wall for engagement with the threaded neck of a bottle to contain pressurized fluids, the threads being limited to about 1¼ turns, the improvement comprising means including venting openings in said side wall contiguous to the knurl region *and above the area of the rolled-on thread* for releasing the pressure within said closure sufficiently to prevent missiling of the closure when the closure is initially turned to unthread it from the bottle.

2. An improved closure in accordance with claim 1, wherein said openings are located at said knurl region.

3. An improved closure in accordance with claim 1, wherein said openings are located between said threads and said knurl region.

4. An improved closure in accordance with claim 1, wherein said side wall has a closure locking ring remote from said top wall.

5. An improved closure in accordance with claim 1, wherein said openings are substantially round.

6. An improved closure in accordance with claim 1, wherein said openings are elongated.

7. An improved closure in accordance with claim 1, wherein said openings are defined by depressed areas of said side wall without removal of shell material.

8. An improved closure in accordance with claim 1, there being about four such openings spaced about the circumference of said side wall.

9. An improved closure in accordance with claim 1, wherein each of said openings has a length less than about 0.080 inch.

10. An improved closure in accordance with claim 1, wherein said openings are provided in groups, with each pair of openings of a group separated by a bridge.

11. An improved closure in accordance with claim [13] *10*, wherein each bridge is at least about 0.040 inch long.

12. An improved closure in accordance with claim 11, wherein each opening has a length of about 0.055 inch.

13. An improved pressurized-bottle closure cup of the type having a top wall and an integral malleable side wall adapted to receive rolled-on threads limited to about 1¼ turns, said cup having a knurl region adjacent to said top wall and having means including venting openings contiguous to said knurl region *and above the area of the side wall which is adapted to receive the rolled-on thread* for releasing pressure from within the closure sufficiently to prevent closure-missiling when the closure is initially turned to unthread it from the threaded neck of a bottle containing pressurized fluid.

14. An improved closure cup in accordance with claim 13, wherein said cup has a seal covering at least at the inner peripheral region of said top wall and wherein said openings are spaced from said seal.

15. An improved closure in accordance with claim 14, wherein each of said openings has a length less than about 0.080 inch.

16. An improved closure in accordance with claim 14, wherein said openings are provided in groups, with each pair of openings of a group separated by a bridge.

17. An improved closure in accordance with claim 16, wherein each bridge is at least about 0.040 inch long.

18. An improved closure in accordance with claim 17, wherein each opening has a length of about 0.055 inch.

19. In combination with a pressurized-fluid bottle of the type having an externally threaded neck, a cap having a top wall adapted to provide a seal upon the mouth of said bottle, a knurl region adjacent to the top wall, and having an integral side wall with threads for engaging said threaded neck, the threads being limited to about 1¼ turns, and venting means in said side wall contiguous to the knurl region for releasing pressure from within said cap sufficiently to prevent missiling of said cap when said cap is turned initially to unthread it from said bottle, said venting means *comprising openings through said side wall between said threads and the region at which said top wall provides said seal upon said mouth.*

[20. A combination in accordance with claim 19, wherein said venting means comprises openings through said side wall between said threads and the region at which said top wall provides said seal upon said mouth.]

21. A combination in accordance with claim [20] *19*, wherein at least some of said openings are freely spaced from the neck of said bottle when said cap is fully threaded thereon.

22. A combination in accordance with claim [20] *19*, there being at least three such openings spaced about the circumference of said cap.

23. A combination in accordance with claim [20] *19*, wherein each of said openings has a length less than about 0.080 inch.

24. A combination in accordance with claim [20] *19*, wherein said openings are provided in groups, with each pair of openings of a group separated by a bridge.

25. A combination in accordance with claim 24, wherein each bridge is at least about 0.040 inch long.

26. A combination in accordance with claim 25, wherein each opening has a length of about 0.055 inch.

27. A combination in accordance with claim 20, wherein said openings are defined by depressed areas of said side wall without removal of cap material.

28. A combination in accordance with claim 23, wherein said venting means substantially releases said pressure within about ¼ turn of said cap when said cap is turned to unthread it.

29. A combination in accordance with claim 23, wherein said venting means substantially releases said pressure within about 10° to 20° of rotation of said cap when said cap is turned to unthread it.

*30. An improved closure in accordance with claim 1, further comprising a sealing gasket covering at least the inner peripheral region of the top wall of the closure above the location of the venting openings and adapted to provide a seal upon the mouth of the bottle.*

* * * * *